United States Patent
Jung et al.

(10) Patent No.: US 8,744,343 B2
(45) Date of Patent: Jun. 3, 2014

(54) METHOD FOR CONTROLLING MOBILITY OF TERMINAL IN BROADBAND WIRELESS ACCESS SYSTEM INCLUDING RELAY STATION

(75) Inventors: In Uk Jung, Anyang-si (KR); Ae Ran Youn, Anyang-si (KR); Ki Seon Ryu, Anyang-si (KR); Yong Ho Kim, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 419 days.

(21) Appl. No.: 13/141,680

(22) PCT Filed: Dec. 23, 2009

(86) PCT No.: PCT/KR2009/007723
§ 371 (c)(1),
(2), (4) Date: Sep. 15, 2011

(87) PCT Pub. No.: WO2010/074509
PCT Pub. Date: Jul. 1, 2010

(65) Prior Publication Data
US 2011/0319013 A1 Dec. 29, 2011

Related U.S. Application Data

(60) Provisional application No. 61/140,086, filed on Dec. 23, 2008.

(51) Int. Cl.
*H04B 17/02* (2006.01)
*H04W 36/00* (2009.01)

(52) U.S. Cl.
USPC ............. 455/11.1; 455/7; 455/9; 455/15; 455/16; 455/444

(58) Field of Classification Search
USPC ............. 455/11.1, 7, 9, 15, 16, 444
See application file for complete search history.

(56) References Cited

U.S. PATENT DOCUMENTS

| 7,801,081 | B2 * | 9/2010 | Choi et al. | 370/331 |
| 2008/0125125 | A1 * | 5/2008 | Choi et al. | 455/436 |
| 2009/0088164 | A1 * | 4/2009 | Shen et al. | 455/436 |

FOREIGN PATENT DOCUMENTS

| JP | 2007116696 | 5/2007 |
| KR | 10-0871620 | 12/2008 |
| KR | 10-0883790 | 2/2009 |

\* cited by examiner

*Primary Examiner* — Tilahun B Gesesse
(74) *Attorney, Agent, or Firm* — Lee, Hong, Degerman, Kang & Waimey

(57) ABSTRACT

The present invention relates to method and device that controls the mobility of a terminal in a broadband wireless access system including a relay station. The present invention provides an efficient method for controlling terminal mobility of a relay station and a method for performing handover of a terminal. The method for controlling mobility of terminal at a relay station in a broadband wireless access system according to one embodiment of the present invention comprises step wherein at least one neighboring base station entity searched is added in a list, and a step wherein a broadcast message including the list is transmitted to the terminal.

12 Claims, 9 Drawing Sheets

US 8,744,343 B2

METHOD FOR CONTROLLING MOBILITY OF TERMINAL IN BROADBAND WIRELESS ACCESS SYSTEM INCLUDING RELAY STATION

CROSS-REFERENCE TO RELATED APPLICATIONS

This application is the National Stage filing under 35 U.S.C. 371 of International Application No. PCT/KR2009/007723, filed on Dec. 23, 2009, which claims the benefit of U.S. Provisional Application Ser. No. 61/140,086, filed on Dec. 23, 2008.

TECHNICAL FIELD

The present invention relates to a wireless access system, and more particularly, to a method and apparatus for controlling mobility of a terminal in a broadband wireless access system including a relay station.

BACKGROUND ART

It is expected that a relay station (RS) will widely be used in a wireless communication system for next generation. Hereinafter, the relay station (RS) will be described in brief.

A standardization project of a new title called multi-hop relay is currently in progress in IEEE (Institute of Electrical and Electronics Engineers) 802.16 of 2006 since publications of the standard IEEE 802.16-2004 based on fixed subscriber mobile stations and the standard IEEE 802.16e-2005 for providing mobility of subscriber mobile stations.

This standardization project handled by a task group j (IEEE 802.16j) within the IEEE 802.16 has started to discuss usage model, related terminologies, and technical requirements in the second meeting on July of 2006 after the first formal meeting on May of 2006. Hereinafter, the IEEE 802.16 task group j will be abbreviated as "802.16j".

The concept of the relay station which will be described later can be used substantially the same as a relay station considered by a 3GPP LTE-A system. Also, a relay station that performs same or similar functions in other various wireless access systems can be used similarly to the relay station described in the present invention.

Project authorization request (PAR) of 802.16j is intended for coverage extension and throughput enhancement as standardization tasks which will be performed.

The relay station can be divided into two types of relay stations, i.e., a transparent relay station and a non-transparent relay station. According to the transparent relay station, all operations and functions are performed within the relay station, and a mobile station is managed by the relay station. On the other hand, according to the non-transparent relay station, all operations and functions are performed between a macro base station and a mobile station. In this case, the non-transparent relay station serves to perform its relay function through the macro base station between the macro base station and the mobile station.

The mobile station regards the transparent relay station and the non-transparent relay station as one macro base station without identification of the transparent relay station and the non-transparent relay station. In this case, although there is no change in operations, the mobile station may classify the relay station from the macro base station.

A network that includes a relay station includes a base station (BS), a relay station (RS), and a mobile station (MS). The mobile station can receive a radio signal even outside a cell zone of the base station through the relay station. Also, a path of high quality having an adaptive modulation and coding (AMC) scheme of high level can be set through the relay station for the mobile station within the cell zone of the base station. Accordingly, a user can obtain an advantage of system throughput enhancement by using the same radio resource.

The standard to be made by the 802.16j project has predetermined requirements. For example, the mobile station implemented based on the existing 802.16-2004 and 802.16e-2005 should perform communication with the relay station without any additional function. Accordingly, an application range of the relay station can be limited to the existing system in such a way to add some function for controlling the relay station to the relay station and the existing base station. It is expected that the standard for the relay station will be a core factor of the standardization.

The relay station can be regarded as a subscriber mobile station that performs operations of a physical layer and a media access control (MAC) layer. Also, the relay station is mainly controlled by the base station but may have a predetermined control function if necessary. As usage models currently in discussion, in addition to a fixed relay station, various types of relay stations are considered. Examples of the relay stations include a mobile relay station for temporarily providing a service to a specific zone and a relay station that can be built in cars or subways.

Main technical issues which will be discussed later can be described as follows:

1) a procedure for identifying a relay station existing in a base station and acquiring and maintaining information on topology with the relay station;

2) definition of a physical transport frame structure between a mobile station and a relay station, which have backward compatibility with the existing IEEE 802.16 system;

3) a signal procedure for providing mobility between relay stations or between a relay station and a base station; and 4) a network entry procedure of a relay station to a base station and an entry procedure of a mobile station through a relay station.

In addition to the aforementioned procedures, it is required that a method for ensuring mobility of a mobile station, that is, efficiency of cell search and handover between macro base stations, between a macro base station and a relay station, or between relay stations should be discussed.

DISCLOSURE

Technical Problem

In various wireless access technologies for commercialization, methods for supporting mobility of a mobile station in a broadband wireless access system including a relay station have been discussed.

An object of the present invention devised to solve the conventional problem is to provide a method for enabling a base station, a relay station and mobile stations to efficiently share information of neighboring macro base stations and/or relay station, thereby supporting mobility of the mobile station in a broadband wireless access system including a relay station.

Another object of the present invention is to provide a method for enabling a mobile station to efficiently perform cell search and handover by using shared information of neighboring macro base stations and/or relay station.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, the present invention discloses a method for efficiently controlling mobility of a mobile station in a relay station and a method for performing handover in a mobile station.

In an aspect of the present invention, a method for enabling a relay station to control mobility of a mobile station in a broadband wireless access system comprises the steps of searching for at least one neighboring base station entity; adding the searched at least one base station entity to a list; and transmitting a broadcast message including the list to the mobile station, wherein the neighboring base station entity includes a neighboring macro base station not a macro base station to which the relay station belongs and a relay station belonging to the neighboring macro base station.

In this case, the list is a neighbor list (NBR_list), and the broadcast message is a neighbor advertisement (AAI_NBR-ADV) message.

Also, the searching step includes transmitting a scan request (AAI_SCN-REQ) message to each of the at least one neighboring base station entity; and receiving a scan response (AAI_SCN-RSP) message from each of the at least one neighboring base station entity.

In another aspect of the present invention, a method for enabling a mobile station to perform handover in a broadband wireless access system including a relay station comprises the steps of receiving a first broadcast message including information on at least one neighboring base station entity from a serving relay station; transmitting a ranging code to a target relay station selected from the at least one neighboring base station entity included in the first broadcast message; receiving a second broadcast message from the serving relay station; and performing handover to the target relay station if the second broadcast message includes the ranging code.

In this case, the first broadcast message is a neighbor advertisement (AAI_NBR-ADV) message, and the at least one neighboring base station entity includes a neighboring macro base station not a macro base station to which the serving relay station belongs and a relay station belonging to the neighboring macro base station.

Also, the ranging code is any one of at least one code included in a predetermined handover ranging code subset allocated from the macro base station to which the serving relay station belongs.

Also, the second broadcast message includes ranging opportunity information and ranging channel information, which are used when the ranging code is transmitted to the target relay station.

Also, the second broadcast message further includes action time information, and the step of performing handover is performed at the time indicated by the action time information.

Also, the second broadcast message is a handover command (AAI_HO-CMD) message.

Moreover, the method further comprises the step of transmitting the ranging code to the serving relay station.

In other aspect of the present invention, a mobile station operated in a broadband wireless access system including a relay station comprises a processor; a radio frequency (RF) module for transmitting and receiving a radio signal to and from the outside under the control of the processor, wherein the processor includes a first broadcast message including information on at least one neighboring base station entity from a serving relay station by controlling the RF module, selects a target relay station from the at least neighboring base station entity included in the first broadcast message, transmits a ranging code to the selected target relay station, receives a second broadcast message from the serving relay station, and performs handover to the target relay station if the second broadcast message includes the ranging code.

In this case, the first broadcast message is a neighbor advertisement (AAI_NBR-ADV) message, and the at least one neighboring base station entity includes a neighboring macro base station not a macro base station to which the serving relay station belongs and a relay station belonging to the neighboring macro base station.

Also, the ranging code is any one of at least one code included in a predetermined handover ranging code subset allocated from the macro base station to which the serving relay station belongs.

Also, the second broadcast message includes ranging opportunity information and ranging channel information, which are used when the ranging code is transmitted to the target relay station.

Also, the second broadcast message further includes action time information, and the step of performing handover is performed at the time indicated by the action time information.

Also, the second broadcast message is a handover command (AAI_HO-CMD) message.

Moreover, the processor further transmits the ranging code to the serving relay station.

Advantageous Effects

According to the embodiments of the present invention, the following advantages can be obtained.

Firstly, the mobile station can efficiently acquire information of neighboring base stations by using a list of neighboring base stations disclosed in the embodiments of the present invention.

Secondly, the mobile station can efficiently search for neighboring base stations and perform handover by using a list of neighboring base stations disclosed in the embodiments of the present invention.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Figure 1:
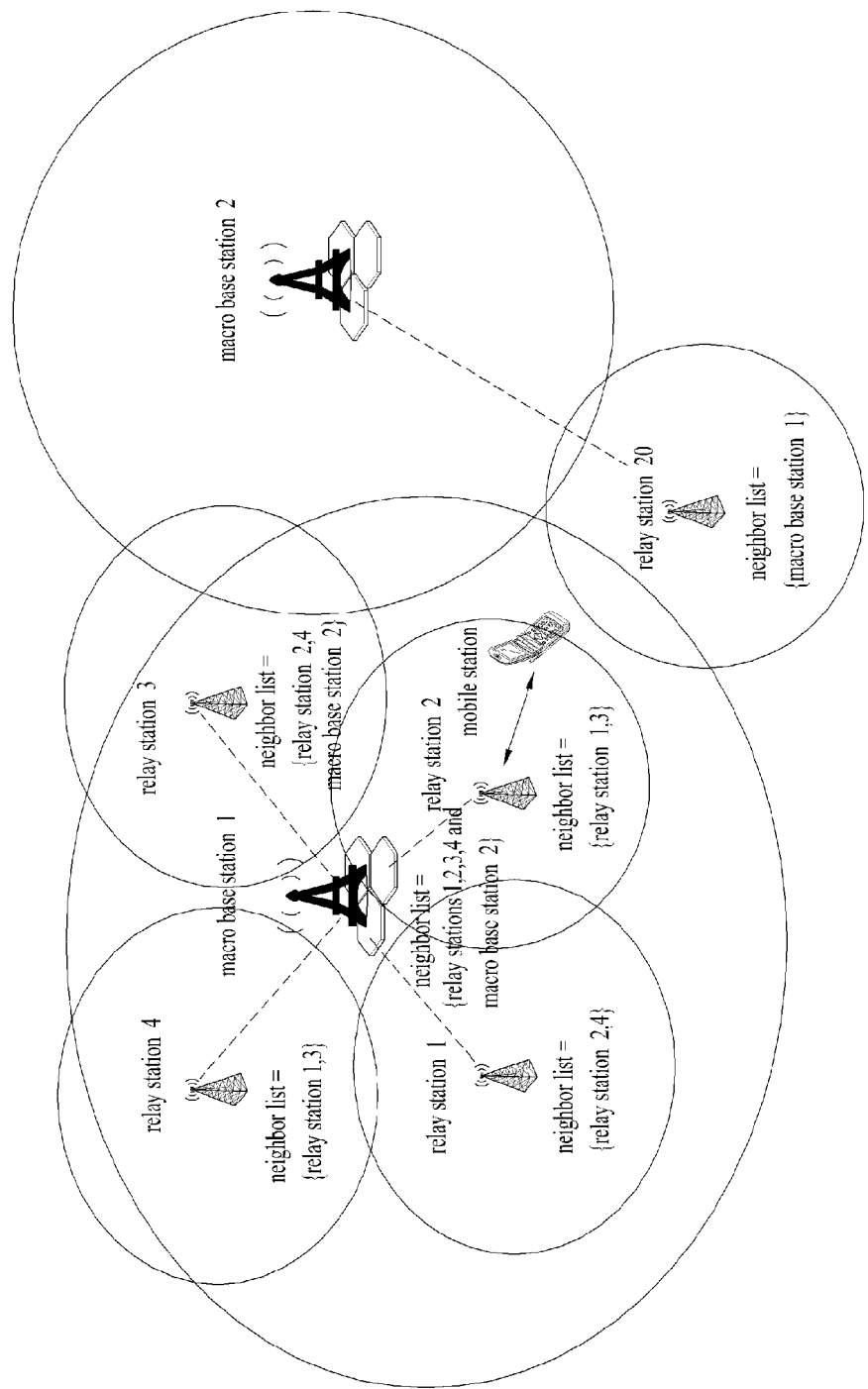
FIG. 1 is a diagram illustrating that a mobile station performs handover from a relay station to which a macro base station belongs to a relay station to which another neighboring macro base station belongs.

The present invention relates to a wireless access system. More particularly, the present invention discloses a method and apparatus for controlling mobility of a mobile station in a broadband wireless access system including a relay station.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will not be disclosed. Also, procedures or steps that may be understood by the person with ordinary skill in the art will not be disclosed.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station (BS) may be replaced with terms such as a fixed station, Node B, eNode B (eNB), and an access point (AP). Also, the mobile station may be replaced with terms such as a user equipment (UE), a subscriber station (SS), a mobile subscriber station (MSS), a mobile terminal (MT) and a terminal.

Furthermore, a transmitting side means a fixed and/or mobile node that provides data services or voice services while a receiving side means a fixed and/or mobile node that receives data services or voice services. Accordingly, in an uplink, the mobile station could be a transmitting side while the base station could be a receiving side. Likewise, in a downlink, the mobile station could be a receiving side while the base station could be a transmitting side.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone.

The embodiments according to the present invention can be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described as above. For example, a software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify the technical features of the present invention can be supported by the above standard documents. Also, all terminologies disclosed herein can be described by the above standard documents. Particularly, the embodiments of the present invention can be supported by one or more of standard documents of IEEE 802.16 system, i.e., P802.16e-2004, P802.16e-2005, P802.16Rev2, and IEEE P802.16m.

Specific terminologies hereinafter used in the embodiments of the present invention are provided to assist understanding of the present invention, and various modifications can be made in the specific terminologies within the range that they do not depart from technical spirits of the present invention.

The following assumptions are applied to a broadband wireless access system that includes a relay station according to the embodiments of the present invention:

1) All relay stations are synchronized with a macro base station;

2) even a mobile station is served from the relay station, it is synchronized with a macro base station to which the corresponding relay station belongs;

3) in case of a transparent relay station (RS), a media access control (MAC) management message is transmitted to the mobile station by a macro base station only or through a relay station;

4) the relay station may have a function of calculating code division multiplexing access (CDMA) code signal measurement information or channel state information (CQI) measurement information for physical control;

5) a control plane can be configured in a centralized mode or a distributed mode;

6) a ranging code for handover (HO) can be distributed from the macro base station to each relay station.

The mobile station can acquire information on a relay station through a neighbor advertisement message, which is broadcasted or unicast, similarly to receiving information on a macro base station through a neighbor advertisement (AAI_NBR-ADV) message. In other words, the mobile station can receive information on neighboring relay stations through a neighbor advertisement (AAI_NBR-ADV) message or MAC management message dedicated for a relay station, wherein the information includes system information on neighboring relay stations.

Since each of the relay stations is an entity belonging to one macro base station, a neighbor advertisement message of the relay station (RS neighbor advertisement message) can include information (that is, neighbor list) on other neighboring relay stations belonging to one macro base station. This is because that the macro base station may fail to acquire information on all relay stations belonging to other neighboring base station or a problem may occur in message capacity (that is, signaling overhead) if the neighbor advertisement message of the relay station (RS neighbor advertisement message) includes information on the relay station belonging to the other macro base station.

Under the circumstances, while the mobile station is being served from the neighboring relay station at the cell edge of the macro base station, it cannot identify information on the relay station existing at the cell edge of a neighboring macro base station, to which the mobile station moves, whereby the mobile station cannot perform handover efficiently. This case will be described with reference to FIG. 1.

FIG. 1 is a diagram illustrating that a mobile station performs handover from a relay station to which a macro base station belongs to a relay station to which another neighboring macro base station belongs.

As illustrated in FIG. 1, even though the mobile station that operates at the relay station 2 of the macro base station 1 is closest to the relay station 20 of the macro base station 2, since the relay station 20 is not included in a neighbor list provided by the relay station 2, inconvenience occurs in that the mobile station should perform handover to the macro base station 2 and then perform handover to the relay station 20.

Accordingly, one embodiment of the present invention suggests a method for controlling a neighbor list so as not to cause such unnecessary and inefficient handover.

Also, according to another embodiment of the present invention, a mobile station can simply perform handover within one macro base station or perform handover to a relay station to which another macro base station belongs.

First Embodiment

First of all, a method for controlling a neighbor list according to one embodiment of the present invention will be described.

As described above, failure of the mobile station in directly performing handover to a relay station existing in other macro base station should be solved. To this end, it is suggested that a method for configuring a neighbor list (NBR list) included in a neighbor advertisement (AAI_NBR-ADV) message of a relay station and a method for transmitting the neighbor list to a mobile station should additionally be defined.

In other words, since it is difficult for the macro base station to add all relay stations existing in its neighboring macro base station to the neighbor advertisement (AAA_NBR-ADV) message, it is not preferably required. Instead, relay stations existing in the macro base station can configure a neighbor advertisement (AAI_NBR-ADV) message specific for a relay station (RS specific neighbor advertisement message) searched within 1 hop or RS specific for other base station entity not the macro base station, based on the neighbor advertisement (AAI_NBR-ADV) message received from the macro base station.

In other words, supposing that the macro base station configures the neighbor advertisement (AAI_NBR-ADV) message through neighboring 1-tier base stations, the relay station can provide the neighbor advertisement (AAI_NBR-ADV) message to the mobile station by additionally including 2-tier base stations in the neighbor advertisement (AAI_NBR-ADV) message. This will be described with reference to FIG. 2.

Figure 2:
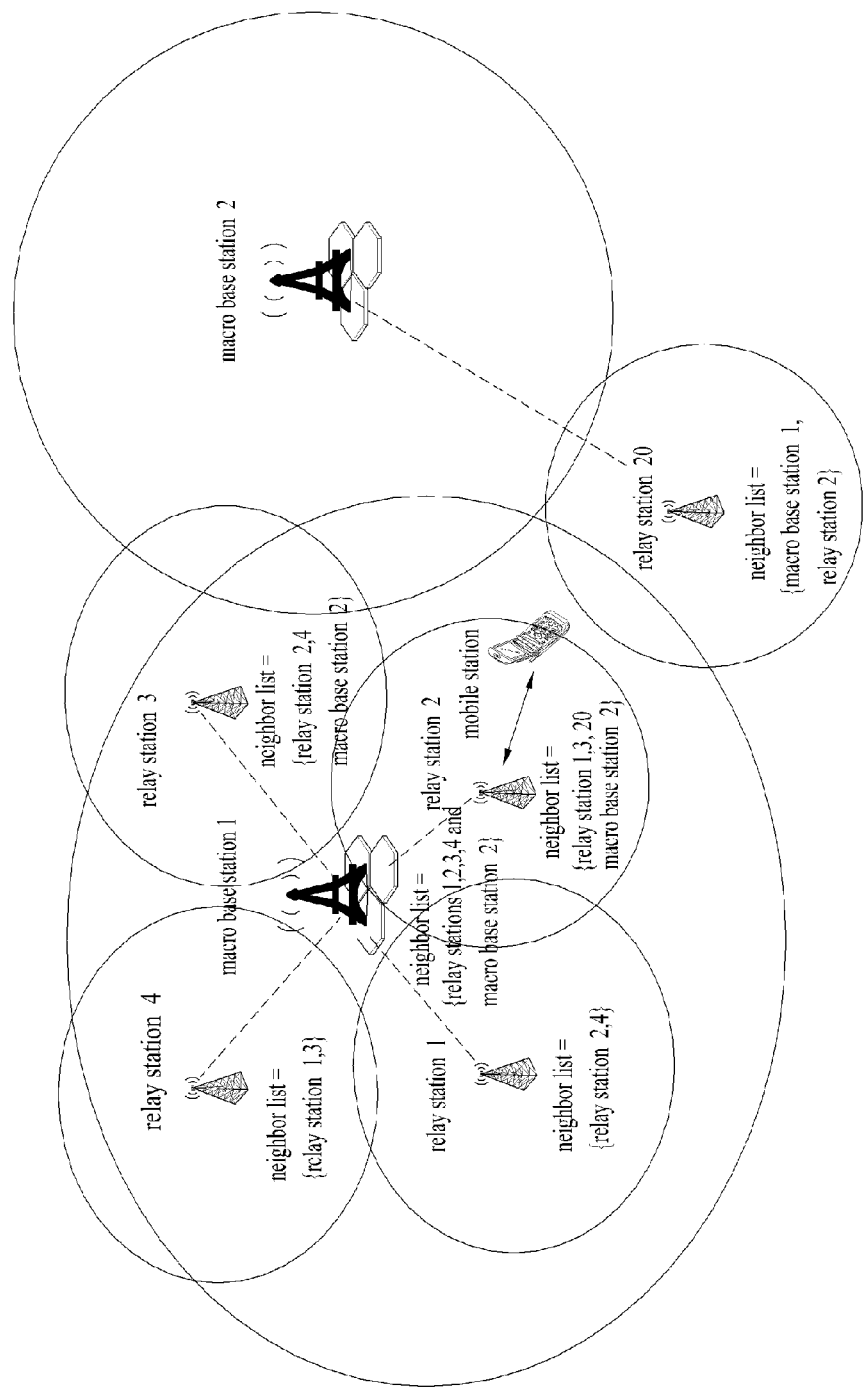
FIG. 2 is a diagram illustrating that a mobile station performs handover from a relay station to which a macro base station belongs to a relay station to which another neighboring macro base station belongs, through a method for configuring a neighbor advertisement message in accordance with one embodiment of the present invention.

FIG. 2 is a diagram illustrating that a mobile station performs handover from a relay station to which a macro base station belongs to a relay station to which another neighboring macro base station belongs, through a method for configuring a neighbor advertisement message in accordance with one embodiment of the present invention.

Referring to FIG. 2, the macro base station configures a neighbor list (NBR list) included in the neighbor advertisement (AAI_NBR-ADV) message based on relay stations belonging to its cell and macro base stations of a neighboring cell, whereas the relay stations configure a neighbor list based on neighboring relay stations located within 1-hop. At this time, each relay station can include relay stations belonging to a neighboring macro base station, among neighboring relay stations located within 1-hop, in the neighbor list. Each relay station can obtain information on relay stations belonging to the neighboring macro base station by scanning neighboring base station entities. To this end, the relay station and the neighboring base station can exchange a scan request (SCN-REQ) message and a scan response (SCN-RSP) message with each other. Since this method for scanning neighboring base station entities can follow a rule defined in the IEEE802.16j specification, its detailed description will be omitted.

The mobile station can receive the information on the neighbor list including the information on the relay station belonging to the neighboring macro base station through the neighbor advertisement message of the corresponding relay station. The mobile station can coordinate scanning on the relay station located in the neighboring base station by using the received neighbor list information. If the mobile station performs handover to the neighboring relay station located within the neighboring macro base station, it performs handover without through the neighboring macro base station. For this reason, the mobile station can reduce overhead caused by unnecessary handover to the neighboring macro base station.

Hereinafter, a detailed handover procedure based on the method for controlling a neighbor list will be described.

If the aforementioned method for controlling a neighbor list is used, the mobile station can identify information on a neighboring relay station belonging to a neighboring macro base station through the neighbor list included in the neighbor advertisement message of the relay station, and can directly perform handover to the neighboring relay station without through the neighboring macro base station. This will be described depending on types of the relay station with reference to FIG. 3 to FIG. 5.

Figure 3:
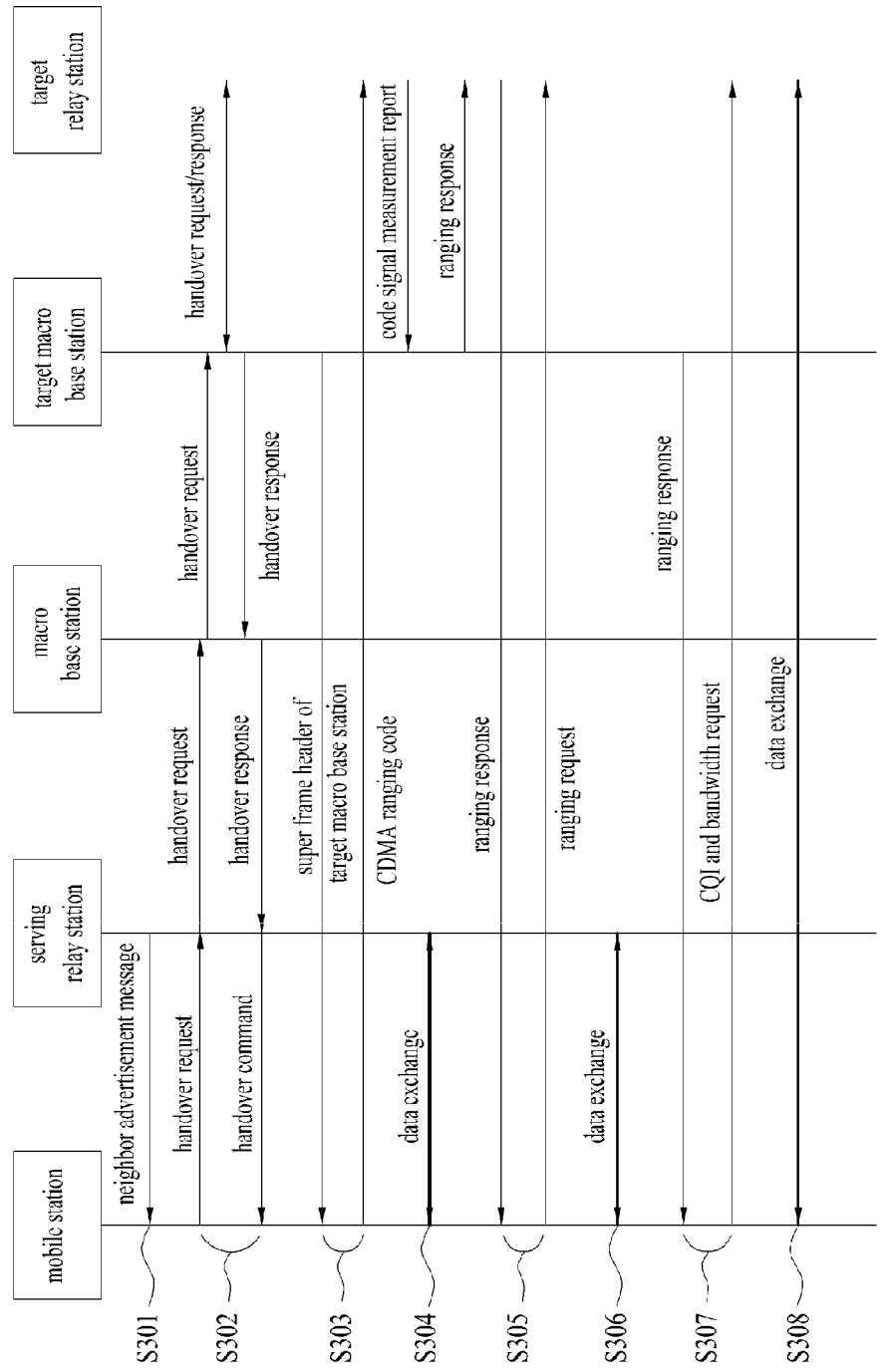
FIG. 3 is a diagram illustrating an example of a handover procedure in a transparent relay station to which a method for controlling a neighbor list in accordance with one embodiment of the present invention is applied.

FIG. 3 is a diagram illustrating an example of a handover procedure in a transparent relay station to which a method for controlling a neighbor list in accordance with one embodiment of the present invention is applied.

In FIG. 3, it is assumed that a serving relay station is a relay station belonging to a macro base station, and a target relay station is a relay station belonging to a target macro base station. It is also assumed that each relay station is a transparent relay station.

Referring to FIG. 3, the mobile station can receive information on a target relay station belonging to a neighboring macro base station (target macro base station) through a neighbor advertisement message (AAI_NBR-ADV) message of a serving relay station (S301).

Then, the mobile station can scan the target relay station and transmit a handover request (AAI_HO-REQ) message, which requests handover to the target relay station, to the serving relay station. The handover request message can be transmitted to the target relay station through the serving relay station, the macro base station, the target macro base station, and the target relay station in due order. The target relay station transmits a handover response (HO-RSP) message to the handover request message to the target macro base station, and the target macro base station transmits the handover response message to the macro base station. The macro base station transmits the handover response message to the serving relay station. The serving relay station transmits a handover command (AAI_HO-CMD) message to the mobile station (S302). At this time, the handover command message may include action time information.

The mobile station can receive a super frame header (SFH) of the target macro base station, whereby it can identify information on a ranging zone of the target macro base station and the target relay station. As a result, the mobile station can transmit a CDMA code to the ranging zone of the target relay station (S303).

The mobile station can exchange data with the serving relay station until it receives a response to the transmitted code. At this time, the target relay station, which has received the code, transmits code signal measurement report information to the target macro base station, and the target base station can transmit an uplink correction value based on the measurement value, i.e., physical (PHY) adjustment parameter to the target relay station through the ranging response (RNG-RSP) message (S304).

The target relay station, which has received the ranging response message, can transmit a ranging response (AAI_RNG-RSP) message, which includes the corresponding correction value, to the mobile station. The mobile station, which has received the ranging response message, can again transmit the ranging request message to the target relay station by applying the uplink correction value to the ranging response message (S305).

Afterwards, the mobile station can exchange data with the serving relay station until it receives a response to the ranging request message (S306).

The mobile station can receive the ranging response (AAI_RNG-RSP) message from the target macro base station at the time indicated by the action time information. As a result, the mobile station can transmit channel status information (CQI) and a bandwidth request (BR-REQ) message to the target relay station (S307).

Afterwards, the mobile station completes handover to the target relay station and exchanges data with the target relay station (S308).

Next, a handover procedure performed when each relay station is a non-transparent relay station in a status similar to that of FIG. 3 will be described with reference to FIG. 4.

Figure 4:
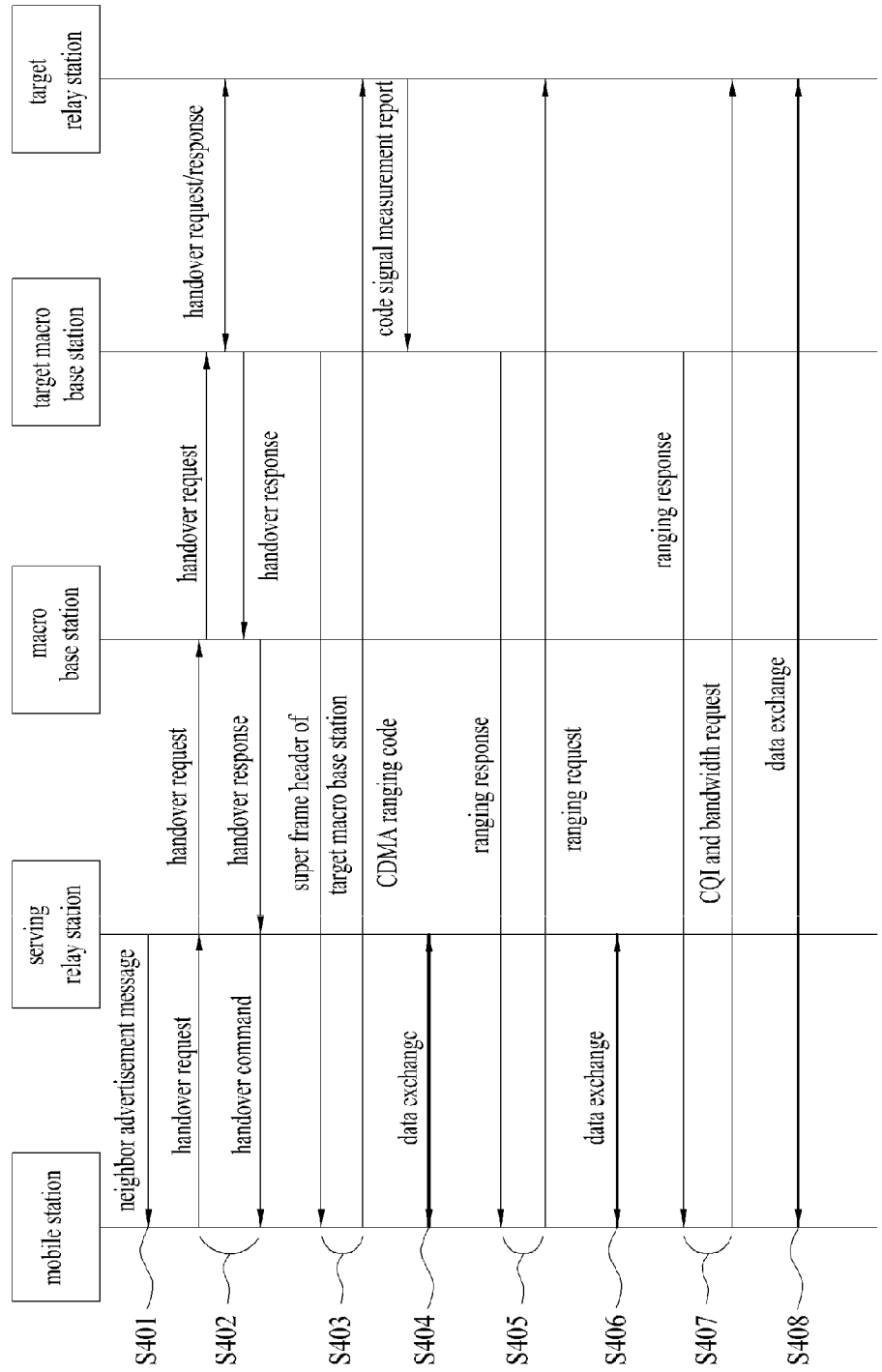
FIG. 4 is a diagram illustrating an example of a handover procedure in a non-transparent relay station to which a method for controlling a neighbor list in accordance with one embodiment of the present invention is applied.

FIG. 4 is a diagram illustrating an example of a handover procedure in a non-transparent relay station to which a method for controlling a neighbor list in accordance with one embodiment of the present invention is applied.

For conciseness of this specification, in the description of FIG. 4, repeated steps corresponding to those of FIG. 3 will be omitted.

Unlike FIG. 3, at step S404, the target macro base station, which has received the code signal measurement report information on the code received by the target relay station, does not transmit a ranging response message to the target relay station. Instead, the target macro base station transmits a ranging response (AAI_RNG-RSP) message, which includes an uplink correction value, to the mobile station.

Also, at step S407, instead of the target relay station, the target base station transmits the ranging response message to the mobile station.

At the steps S404 and S407, instead of the target relay station, the target macro base station transmits the ranging response message to the mobile station. This is because that the relay station is a non-transparent relay station. The description of the following steps will be omitted.

Figure 5:
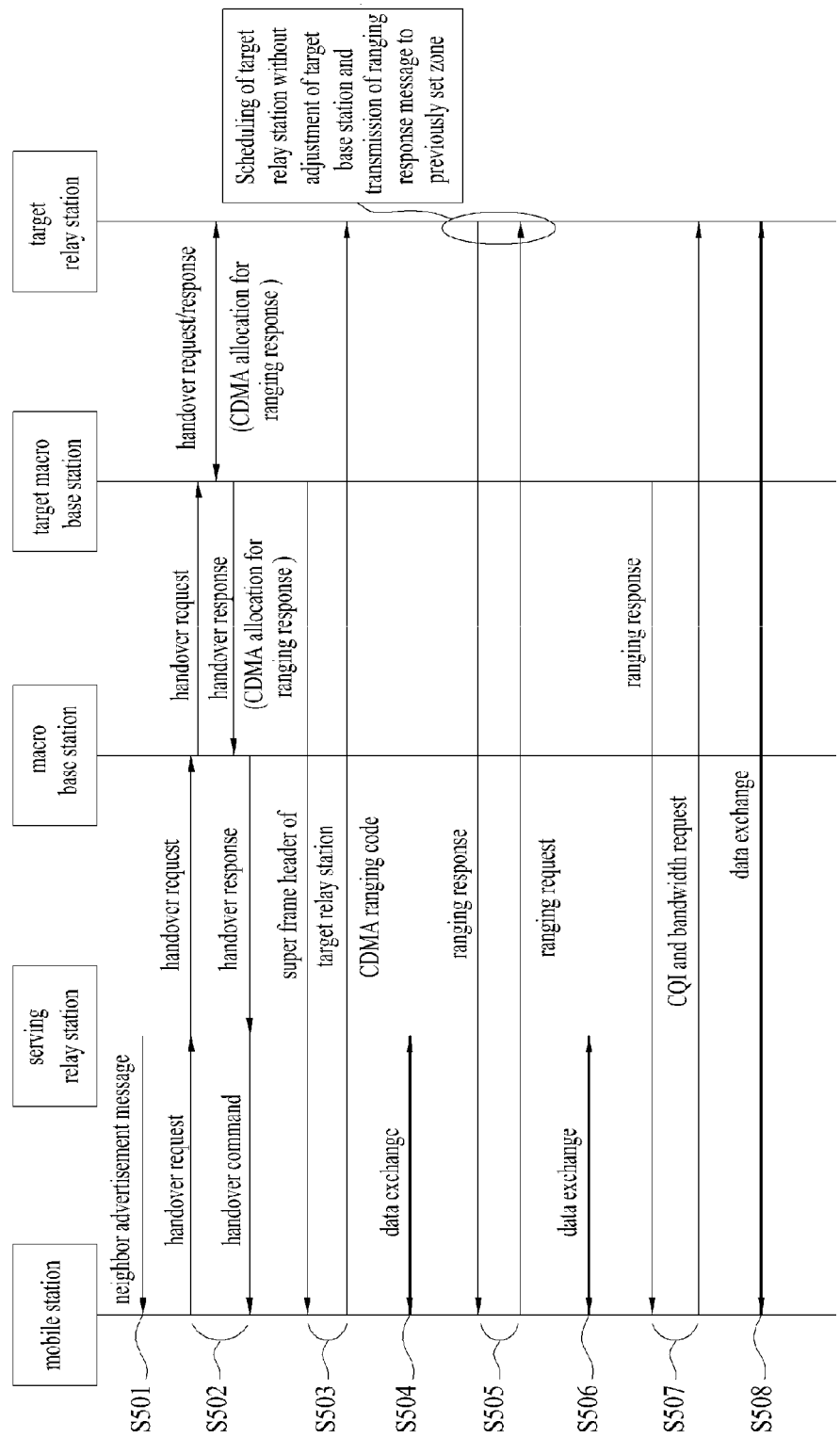
FIG. 5 is a diagram illustrating an example of a handover procedure in which CDMA code measurement is performed in a non-transparent relay station to which a method for controlling a neighbor list in accordance with one embodiment of the present invention is applied.

In the handover procedure described with reference to FIG. 3 and FIG. 4, since the relay station cannot perform code measurement directly, it has transmitted the code signal measurement report information on the transmitted code to the target macro base station. In FIG. 5, the case where the relay station can directly perform code measurement will be described.

FIG. 5 is a diagram illustrating an example of a handover procedure in which CDMA code measurement is performed in a non-transparent relay station to which a method for controlling a neighbor list in accordance with one embodiment of the present invention is applied.

For conciseness of this specification, in the description of FIG. 5, repeated steps corresponding to those of FIG. 3 will be omitted.

At step S503, the mobile station can acquire information on a ranging zone by directly receiving a super frame header of the target relay station not the target macro base station.

Also, at step S504, since the target relay station can directly perform measurement on the transmitted code, it does not transmit code signal measurement report information to the target base station. At step S505, the target relay station can transmit a ranging response (AAI_RNG-RSP) message to the mobile station by directly calculating a correction value.

Afterwards, at step S507, the mobile station and the target relay station can exchange the ranging response (AAI_RNG-RSP) message, channel status information and a bandwidth request message with each other without through the target macro base station.

Second Embodiment

Hereinafter, a method for simplifying handover of a mobile station within one macro base station or to a relay station belonging to another macro base station in accordance with another embodiment of the present invention will be described.

It is assumed that the method for controlling a neighbor list as suggested in one embodiment of the present invention is applied to a handover method according to another embodiment of the present invention. In this embodiment, the case where the target relay station to which the mobile station performs handover is the same as the macro base station to which the serving relay station belongs and the case where the target relay station belongs to other macro base station will be described.

1) The Case Where the Target Relay Station Belongs to the Same as the Macro Base Station to Which the Serving Relay Station Belongs The mobile station can quickly perform handover to other target relay station belonging to the same macro base station based on that the relay stations belonging to the same macro base station are able to perform context sharing of the mobile station and are controlled by the same macro base station.

In this embodiment, in order to simplify the handover procedure of the mobile station, the macro base station distributes a CDMA ranging code subset for handover to the relay stations belonging thereto. Preferably, the handover CDMA code subset is allocated so that neighboring relay stations are not overlapped with each another.

This code subset can be acquired through a predetermined broadcast message of the mobile station or a ranging response message (AAI_RNG-RSP) during cell initial entry.

At this time, the mobile station can select any one (randomly) from the handover CDMA ranging code subset allocated to its serving relay station and then can transmit the selected one to i) both the target relay station and the serving relay station and ii) the target relay station only.

Figure 6:
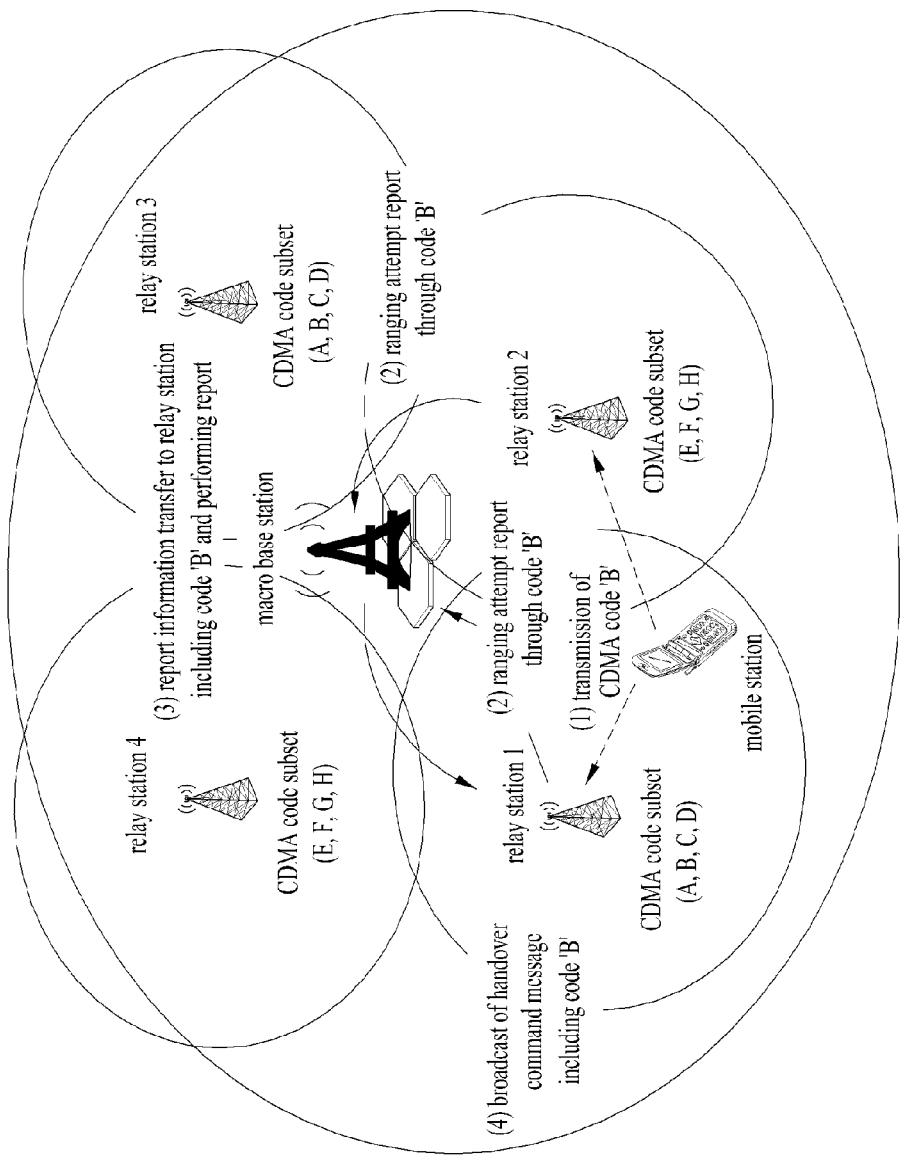
FIG. 6 is a diagram illustrating an example of a handover code division multiplexing access ranging code subset allocated to a plurality of relay stations belonging to one macro base station and handover of a mobile station based on the handover code division multiplexing access ranging code subset in accordance with another embodiment of the present invention.

First of all, the method for transmitting the selected ranging code to both the target relay station and the serving relay station will be described.

i) The case where the ranging code is transmitted to both the serving relay station and the target relay station:

FIG. 6 is a diagram illustrating an example of a handover code division multiplexing access ranging code subset allocated to a plurality of relay stations belonging to one macro base station and handover of a mobile station based on the handover code division multiplexing access ranging code subset in accordance with another embodiment of the present invention.

Referring to FIG. 6, the macro base station allocates handover CDMA code subsets to relay stations existing within its cell so as not to overlap the relay stations with one another. Since cell zones of the relay station 1 and the relay station 3 are not overlapped with each other, the can be set to reuse the same code subset. In this way, if the code subset is efficiently distributed to the relay stations, the relay station can identify brief location information when the mobile station performs CDMA code ranging.

The relay station, which has received the handover CDMA ranging code, reports it to the macro base station. The macro base station retains the transmitted code, the ranging opportunity time when the corresponding code is transmitted, and a ranging zone, i.e., ranging channel information in the code subset, and transfers the ranging channel information to the relay station that has performed the report. At this time, the information transferred to the relay station can include information on a physical (PHY) adjustment parameter. As a result, the macro base station transfers the corresponding report information to the serving relay station.

If the aforementioned procedure is applied to FIG. 6, the mobile station selects 'B" of a code set {A, B, C, D} of the serving relay station and transmits the selected code to the serving relay station, that is, relay station 1, and the target relay station, that is, relay station 2. Then, the relay stations 1 and 2, which have received the code 'B', report to the macro base station that there is ranging attempt through the corresponding code 'B'. The macro base station retains the corresponding code and transmits the reported information to the relay station which has performed the report. Although the code 'B' is retained by the relay stations 1 and 3, since the relay station 3 has not performed the report, it transmits the reported information to the relay station 1. At this time, the macro base station can identify that the mobile station is located in the cell zone of the relay station 1.

The serving relay station, which has received the reported information, broadcasts the corresponding information to its zone. At this time, the serving relay station can broadcast the corresponding information through a handover command (AAI_HO-CMD) message.

When the target relay station reports ranging attempt based on the corresponding code to the macro base station, handover action time that can be performed by the mobile station may be included in the reported information. This action time information may be included in the report information transmitted from the macro base station to the serving relay station.

The mobile station, which has received the report information from the serving relay station through the broadcast message, identifies whether the report information is a response to the code transmitted from itself. In other words, the mobile station identifies whether the CDMA code included in the report information is report information corresponding to itself, through ranging opportunity information and ranging channel information, which are received from the target relay station. The mobile station, which has identified the report information, is prepared to perform handover by using the corresponding information. If coordination information such as action time for handover is included in the corresponding information, the mobile station can quickly perform handover to the target relay station based on the coordination information.

Figure 7:
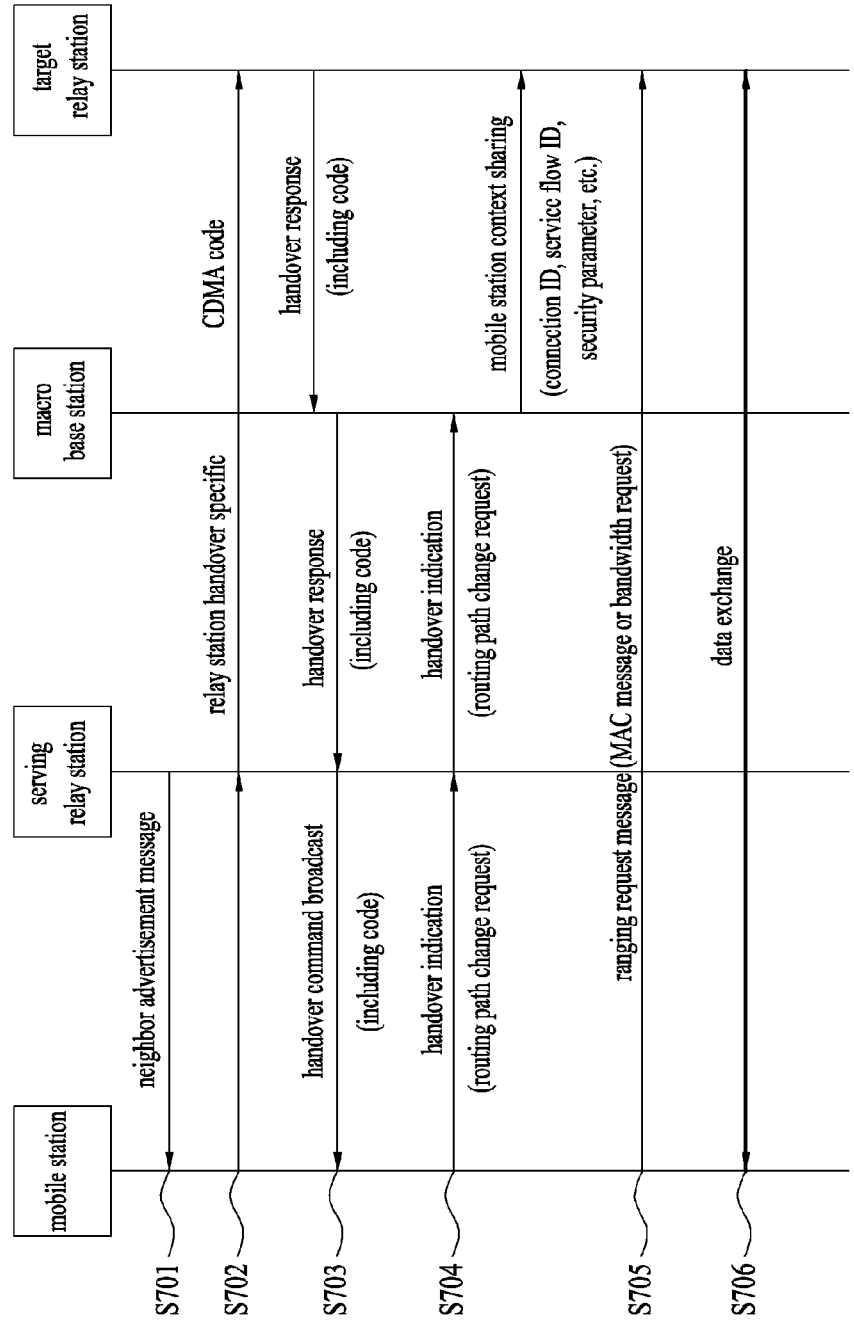
FIG. 7 is a diagram illustrating another example of a handover code division multiplexing access ranging code subset allocated to a plurality of relay stations belonging to one macro base station and handover of a mobile station based on the handover code division multiplexing access ranging code subset in accordance with another embodiment of the present invention.

Next, the case where the mobile station transmits the ranging code to the target relay station only will be described.

ii) The case where the ranging code is transmitted to the target relay station only:

FIG. 7 is a diagram illustrating another example of a handover code division multiplexing access ranging code subset allocated to a plurality of relay stations belonging to one macro base station and handover of a mobile station based on the handover code division multiplexing access ranging code subset in accordance with another embodiment of the present invention.

Referring to FIG. 7, the mobile station can acquire information on the target relay station through a neighbor advertisement message (S701).

Then, the mobile station selects any one (relay station handover specific CDMA code) of handover CDMA code subsets allocated to its serving relay station and transmits the selected one to the target relay station (S702).

The target relay station reports to the macro base station that there is ranging attempt through the corresponding CDMA code. At this time, a handover response message can be used as a message for report. This report message can include the corresponding CDMA code, ranging opportunity information, ranging channel information, and action time information. The macro base station transmits the report information to the serving relay station, and the serving relay station again broadcasts the corresponding report information to the mobile station (S703). At this time, a handover command (AAI_HO-CMD) message can be used as the broadcast message.

The mobile station, which has received the handover command message, can transmit a handover indication (AAI_HO-IND) message to the serving relay station, wherein the handover indication message indicates that the mobile station will perform handover to the target relay station by using the information included in the handover command message (that is, indicates that routing path change will be requested to the serving relay station). Then, the serving relay station transmits the handover indication message to the macro base station, wherein the handover indication message includes information commanding the macro base station to change the routing path of the mobile station. The macro base station can transmit context of the mobile station, for example, connection ID (CID), service flow ID (SFID), and security parameter, to the target relay station (S704).

Afterwards, if the action time information is included in the report information, the mobile station can transmit a ranging request message to the target relay station at the time indicated by the action time information (S705). At this time, the ranging request message may be replaced with other MAC management message or a bandwidth request (BR-REQ) message.

Afterwards, the mobile station and the target relay station can normally exchange data with each other after completing the handover procedure (S706).

If the handover procedure described with reference to FIG. 7 is performed on the network of the same configuration (that is, arrangement of the same relay station and allocation of the same handover CDMA ranging code subset) as that of FIG. 6, the step of transmitting the handover response message from the macro base station to the relay station in step S703 can be performed for all the relay stations having the same code set. For example, if the code 'B' is transmitted to the target relay station in the same manner as FIG. 6, the macro base station transmits the report information to the relay station 1 and the relay station 3, and the relay station 1 and the relay station 3 broadcast the corresponding report information.

In FIG. 6 and FIG. 7, it is assumed that the target relay station and the serving relay station belong to the same macro base station. Hereinafter, on the assumption that the serving relay station and the target relay station belong to their respective macro base station, a method for efficiently performing handover in accordance with another embodiment of the present invention will be described.

Figure 8:
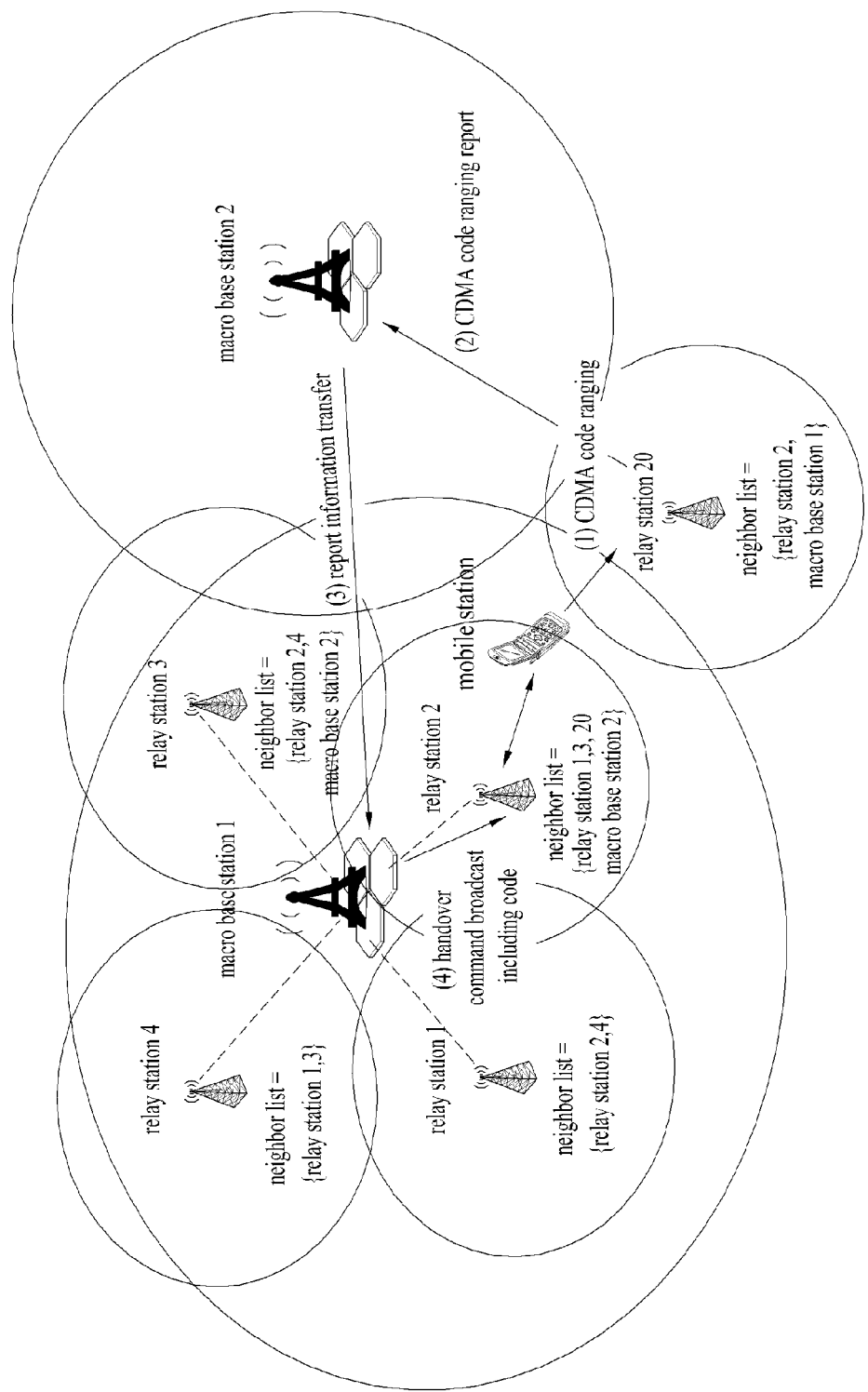
FIG. 8 is a diagram illustrating an example of a handover code division multiplexing access ranging code subset allocated to a plurality of relay stations belonging to different macro base stations and handover of a mobile station based on the handover code division multiplexing access ranging code subset in accordance with another embodiment of the present invention.

2) The Case Where the Target Relay Station Belongs to a Macro Base Station Different from the Macro Base Station to Which the Serving Relay Station Belongs FIG. 8 is a diagram illustrating an example of a handover code division multiplexing access ranging code subset allocated to a plurality of relay stations belonging to different macro base stations and handover of a mobile station based on the handover code division multiplexing access ranging code subset in accordance with another embodiment of the present invention.

Referring to FIG. 8, the mobile station can acquire information on a neighboring target relay station, that is, relay station 20, which belongs to a neighboring macro base station, by receiving a neighbor list based on the method for controlling a neighbor list in accordance with one embodiment of the present invention.

Then, the mobile station selects any one of handover CDMA ranging code subsets allocated to its serving relay station and transmits the selected one to the relay station 20.

The target relay station 20, which has received the code, reports to the macro base station 2, to which the target relay station 20 belongs, that there is ranging attempt through the corresponding CDMA code. At this time, a handover response message can be used as a message for report. This report message can include the corresponding CDMA code, ranging opportunity information, ranging channel information, and action time information. The macro base station 2 transmits the report information to the macro base station 1 to which the serving relay station 2 of the mobile station belongs, and the macro base station 1 can transmit the information included in the report message to all the relay stations that include the corresponding CDMA code in the code subset. If the mobile station also transmits the corresponding code to its serving relay station, the macro base station 1 can transmit the information included in the report message to the serving relay station 2 only.

The serving relay station 2 can again broadcast the information included in the corresponding report message to the mobile station. At this time, a handover command (AAI_HO-CMD) message can be used as the broadcast message.

The mobile station, which has received the handover command message, can transmit a handover indication (AAI_HO-IND) message to the serving relay station, wherein the handover indication message indicates that the mobile station will perform handover to the target relay station by using the information included in the handover command message (that is, indicates that routing path change will be requested to the serving relay station). Then, the serving relay station transmits the handover indication message to the macro base station, wherein the handover indication message includes information commanding the macro base station to change the routing path of the mobile station. The macro base station 1 can transmit context of the mobile station, for example, connection ID (CID), service flow ID (SFID), and security parameter, to the macro base station 2 through a backbone network.

The macro base station 2 can again transmit the context of the corresponding mobile station to the target relay station. Then, the context of the mobile station can be acquired by the target relay station, and the mobile station can quickly perform handover by using the context.

Hereinafter, as other embodiment of the present invention, a mobile station (MS) and a femto base station (FBS) through which the embodiments of the present invention can be carried out will be described.

The mobile station is operated as a transmitting side in an uplink, whereas it is operated as a receiving side in a downlink. Also, the base station is operated as a receiving side in the uplink, whereas it is operated as a transmitting side in the downlink. In other words, each of the mobile station and the base station can include a transmitting side and a receiving side for transmission and reception of information or data.

The transmitting side and the receiving side can include a processor, a module, a part, and/or a means, for which the embodiments of the present invention are carried out. In particular, the transmitting side and the receiving side can include a module (means) for encoding messages, a module for decoding the encoded messages, and an antenna for transmitting and receiving messages. An example of the transmitting side and the receiving side will be described with reference to FIG. 9.

Figure 9:
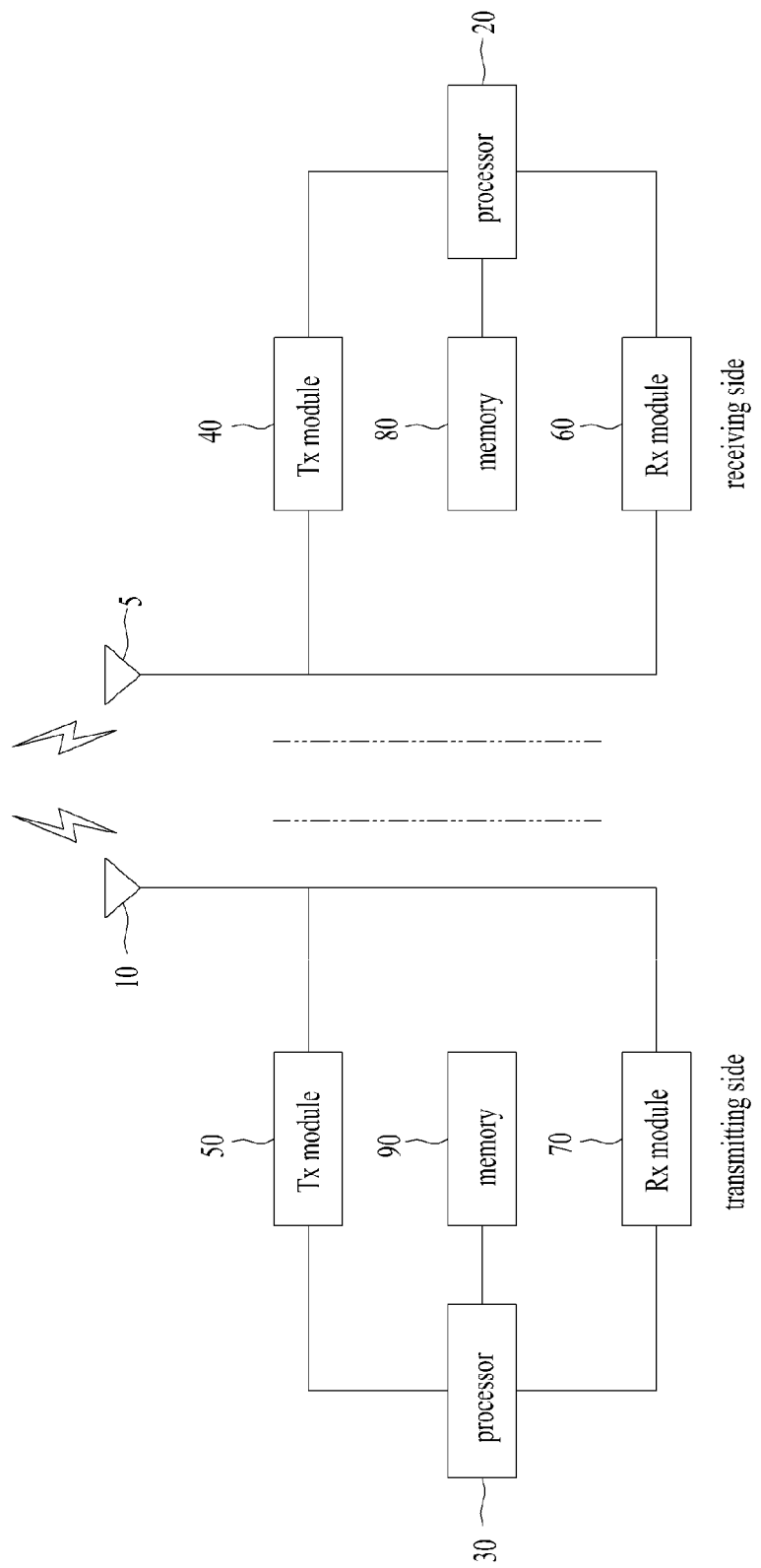
FIG. 9 is a block diagram illustrating an example of a transmitting side and a receiving side in accordance with other embodiment of the present invention.

FIG. 9 is a block diagram illustrating an example of a transmitting side and a receiving side in accordance with other embodiment of the present invention.

Referring to FIG. 9, the left side represents a structure of the transmitting side while the right side represents a structure of the receiving side. Each of the transmitting side and the receiving side can include an antenna 5, 10, a processor 20, 30, a Tx module 40, 50, an Rx module 60, 70, and a memory 80, 90. The respective elements can perform functions corresponding to those of counterparts. Hereinafter, the respective elements will be described in more detail.

The antenna 5, 10 serves to transmit a signal generated by the Tx module 40, 50 to the outside or receive a radio signal from the outside to transfer the radio signal to the Rx module 60, 70. If a MIMO function is supported, two or more antennas may be provided.

The antenna, the Tx module, and the Rx module can constitute a radio frequency (RF) module.

The processor 20, 30 generally controls the whole operation of the mobile station. For example, the processor 20, 30 can perform a controller function for performing the aforementioned embodiments of the present invention, a medium access control (MAC) frame variable control function according to service characteristics and radio wave condition, a handover function, an authentication and encryption function, etc.

Particularly, the processor of the mobile station can search for a neighboring relay station and perform handover by using a neighbor list included in the neighbor advertisement message described in the embodiments of the present invention.

In more detail, the processor of the mobile station can receive the neighbor advertisement message by controlling the RF module in its serving cell, and can select the target relay station for handover by using the neighbor list information of the neighbor advertisement message. Also, the processor of the mobile station can acquire the handover CDMA ranging code subsets allocated to the serving relay station, select any one of the handover CDMA ranging code subsets, transmit the selected one to both the serving relay station and the target relay station or the target relay station only by controlling the RF module. Afterwards, the processor of the mobile station can receive a handover command message broadcasted from the serving relay station, identify whether information included in the handover command message, for example, the CDMA code transmitted from itself is included in the handover command message, and identify whether the handover command message is a response to the CDMA code transmitted from itself, by using ranging opportunity information and ranging channel information. As a result, if the corresponding message is the response to the CDMA code transmitted from the mobile station, the mobile station can perform handover to the target relay station at the time indicated by action time information.

Also, the processor of the relay station can acquire information on a neighboring macro base station by using the neighbor advertisement information of the macro base station to which the relay station belongs, and can add the information of the relay station belonging to other macro base station to the neighbor list of the neighbor advertisement message broadcasted from itself by scanning neighboring cells based on the acquired information.

The processor of the relay station allocates uplink resource required for the mobile station by analyzing the MAC message or data transmitted from the mobile station, generates uplink grant for notifying the mobile station of the allocated details, and perform scheduling for transmitting the uplink grant. Also, the processor of the relay station allocates ID required for the mobile station, such as STID and FID, generates a message including frame offset information and/or zone allocation information, and transmits the generated message to the mobile station.

The Tx module 40, 50 performs predetermined coding and modulation for data, which are scheduled from the processor 20, 30 and then transmitted to the outside, and then transfers the coded and modulated data to the antenna 10.

The Rx module 60, 70 performs decoding and demodulation for the radio signal received from the outside through the antenna 5, 10 to recover original data and then transfer the recovered data to the processor 20, 30.

The memory 80, 90 may store a program for processing and control of the processor 20, 30, or may perform a function for temporarily storing input/output data (in case of the mobile station, uplink (UL) grant allocated from the base station, system information, STID, FID, action time, MBS zone allocation information, etc.). Also, the memory 80, 90 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In the mean time, the base station can perform a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function through at least one of the aforementioned modules, or further include a separate means, module, or part for performing the aforementioned functions.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

Industrial Applicability

The embodiments of the present invention can be applied to various wireless access systems. Examples of various wireless access systems include 3GPP ($3^{rd}$ generation partnership project), 3GPP2 and/or IEEE 802.xx (Institute of electrical and electronic engineers 802) system. The embodiments of the present invention can be applied to all the technical fields based on the various wireless access systems as well as the various wireless access systems.

What is claimed is:

1. A method for performing handover carried out by a mobile station in a broadband wireless access system including a relay station, the method comprising:
receiving, by the mobile station, a first broadcast message, including information on at least one neighboring base station entity, from a serving relay station;
transmitting, by the mobile station, a ranging code to a target relay station selected from the at least one neighboring base station entity included in the first broadcast message;
receiving, by the mobile station, a second broadcast message from the serving relay station; and
performing, by the mobile station, handover to the target relay station if the second broadcast message includes the ranging code,
wherein the second broadcast message includes ranging opportunity information and ranging channel information that are used when the ranging code is transmitted to the target relay station.

2. The method according to claim 1, wherein the first broadcast message is a neighbor advertisement (AAI_NBR-ADV) message, and the at least one neighboring base station entity includes a neighboring macro base station that is not a macro base station to which the serving relay station belongs and a relay station belonging to the neighboring macro base station.

3. The method according to claim 2, wherein the ranging code is any one of at least one code included in a predetermined handover ranging code subset allocated from the macro base station to which the serving relay station belongs.

4. The method according to claim 1, wherein the second broadcast message further includes action time information, and the handover is performed at a time indicated by the action time information.

5. The method according to claim 1, wherein the second broadcast message is a handover command (AAI_HO-CMD) message.

6. The method according to claim 1, further comprising transmitting the ranging code to the serving relay station.

7. A mobile station operated in a broadband wireless access system including a relay station, the mobile station comprising:
a processor;
a radio frequency (RF) module for transmitting and receiving a radio signal to and from the outside under the control of the processor,
wherein the processor is configured to:
control the RF module to receive a first broadcast message including information on at least one neighboring base station entity from a serving relay station;
select a target relay station from the at least neighboring base station entity included in the first broadcast message;
control the RF module to transmit a ranging code to the selected target relay station and receive a second broadcast message from the serving relay station; and
perform handover to the target relay station if the second broadcast message includes the ranging code,
wherein the second broadcast message includes ranging opportunity information and ranging channel information that are used when the ranging code is transmitted to the target relay station.

8. The mobile station according to claim 7, wherein the first broadcast message is a neighbor advertisement (AAI_NBR-ADV) message, and the at least one neighboring base station entity includes a neighboring macro base station that is not a macro base station to which the serving relay station belongs and a relay station belonging to the neighboring macro base station.

9. The mobile station according to claim 8, wherein the ranging code is any one of at least one code included in a predetermined handover ranging code subset allocated from the macro base station to which the serving relay station belongs.

10. The mobile station according to claim 7, wherein the second broadcast message further includes action time information, and the handover is performed at a time indicated by the action time information.

11. The mobile station according to claim 7, wherein the second broadcast message is a handover command (AAI_HO-CMD) message.

12. The mobile station according to claim 7, wherein the processor is further configured to control the RF module to transmit the ranging code to the serving relay station.

* * * * *